United States Patent Office 3,056,798
Patented Oct. 2, 1962

3,056,798
PROCESS FOR THE PREPARATION OF 2-(2'-FURYLMERCAPTO)PYRIDINE-1-OXIDES
Charles E. Maxwell III, Quaker Hill, and Philip N. Gordon, Old Lyme, Conn., assignors to Chas. Pfizer & Co., Inc., Brooklyn, N.Y., a corporation of Delaware
No Drawing. Filed Feb. 28, 1961, Ser. No. 92,174
5 Claims. (Cl. 260—294.8)

This application is concerned with a new and useful method for the preparation of 2-(5'-nitro-2'-furfurylmercapto)pyridine-1-oxide and 2-(2'-furfurylmercapto)pyridene-1-oxide. These compounds are useful anti-pathogenic agents. They are active in the control of a number of pathogenic organisms including phytopathogens and others recognized as the causative agent in many ills afflicting animals, including humans. The compounds are described and claimed in copending patent application Serial Number 29,564 filed May 17, 1960, now Patent No. 3,027,379.

As described in the said copending application, the compounds are prepared by reaction between a furfuryl halide or 5-nitrofurfuryl halide and 2-mercaptopyridine-1-oxide. The reaction is carried out in a lower alkanol or ketone solvent containing up to nine carbon atoms including, for example, methanol, ethanol and acetone. The reaction temperature is from about 50° C. to about 100° C. and the time, from about one to about twenty hours.

It is apparent that in order to carry out the above reaction one must necessarily prepare a 2-mercaptopyridine-1-oxide. Heretofore this has been accomplished by treating a 2-halopyridine-1-oxide with a metallic sulfide such as sodium sulfide usually in a hydrated form and neutralizing the sodium salt so formed. Alternatively, it has been prepared by treatment of a 2-halopyridine-1-oxide with a compound such as thiourea, imidazoline-2-thione, hexahydropyrimidine-2-thione or hexahydrodiazepine-2-thione followed by hydrolysis of the resulting compound.

It has now unexpectedly been discovered that it is possible to eliminate the intermediate formation and isolation of 2-mercaptopyridine-1-oxide and thus eliminate one step in the reaction sequence between 2-halopyridine-1-oxide and 2-(2'-furfurylmercapto)pyridine-1-oxide and 2-(5'-nitro-2'-furfurylmercapto)pyridine-1-oxide. This is accomplished by reacting the reaction product of the 2-halopyridine-1-oxide and imidazoline-2-thione, that is 2-2'-imidazolinylmercapto)pyridine-1-oxide hydrohalide, directly with a furfuryl halide or nitrofurfuryl halide in which the halogen atom has an atomic weight greater than nineteen. The reaction is carried out in the presence of a weak base, that is one having a $pK_b$ value of not less than 4.74 in aqueous solution. This is a most valuable and unexpected finding, not only because it permits the elimination of a reaction step, but also because the reaction can be carried out at a lower temperature (from about 0° C. to about 50° C.) than is required for reaction between 2-mercaptopyridine-1-oxide and the selected furfuryl halide thus markedly decreasing the possibility of side reactions. A further advantage of the reaction is that the product crystallizes out of solution as it forms and can be recovered in good yields of remarkably high quality product by a simple filtration. Other acid addition salts which can serve as starting compounds are prepared from the hydrohalide by first converting the hydrohalide to a free base and subsequently regenerating a new acid addition salt in accordance with standard procedures.

In carrying out the reaction a 2-(2'-imidazolinylmercapto)pyridine-1-oxide acid addition salt, usually a hydrohalide, is taken up in a lower alkanol solvent containing the selected furfuryl halide, and an alkaline reagent is added while maintaining the temperature between about 0° C. and about 50° C. The time of reaction is not critical, but to insure complete reaction the mixture is stirred for from about one half to about six hours. The product forms and precipitates during the reaction period. It may be recovered by filtration. If desirable, it may be recrystallized, for example, by dissolving in glacial acetic acid which is then diluted with water and cooled.

Suitable solvents include alkanols containing up to five carbon atoms. Methanol is preferred but other solvents such as dimethyl sulfoxide or dimethylformamide may also be used. Mixtures of solvents can be employed. The presence of water, e.g. that required to dissolve the base is not harmful.

Typical weak bases which may be employed include ammonium hydroxide, triethyl amine and other nitrogenous bases and salts which in aqueous solution hydrolyze to form alkaline solutions. There may be mentioned by way of example calcium carbonate, barium carbonate and sodium bicarbonate. Inorganic bases such as calcium hydroxide, barium hydroxide and calcium oxide may also be employed. The preferred amount of alkaline reagent is that quantity required to neutralize the acid addition salt. A slight excess may be employed but it is preferred to add no more than a 1% molar excess, especially if a nitrofurfuryl halide is used. This aids in decreasing the possibility of deleterious side reactions. The base may be added directly or in solution. Thus, if sodium bicarbonate is used, it may be added in solid form, in aqueous solution or in aqueous alkanol solution.

To insure most efficient utilization of each reactant, equimolar quantities are utilized. A small molar excess, for example up to 10% molar excess of either reactant, may also be used.

The preferred temperature is room temperature, that is from about 20° C. to about 30° C. The preferred time is about one to about two hours, although time is not critical since some product forms almost immediately upon mixing the reactants.

In summary, this invention is a process for the preparation of a compound selected from the group consisting of 2-(5'-nitro-2'-furfurylmercapto)pyridine-1-oxide and 2-(2'-furfurylmercapto)pyridine-1-oxide which comprises adding up to a 1% molar excess of an alkaline reagent with a $pK_b$ value of greater than 4.74 in aqueous solution to a reactant mixture of an acid addition salt of 2-(2'-imidazolinylmercapto)pyridine-1-oxide and a compound selected from the group consisting of nitrofurfuryl halides and 5-nitrofurfuryl halides, a halogen atom having an atomic weight greater than 19, in a solvent system consisting of alkanols containing up to five carbon atoms, dimethyl sulfoxide, dimethyl formamide and mixtures of these while maintaining the temperature between about 0° C. and 50° C., up to a 10% molar excess of any one of the reactants being employed. The preferred acid addition salt is hydrochloride. The preferred furfuryl halide is a bromide because it is more stable than the iodide and more reactive than the chloride.

Although this disclosure is specifically directed to the preparation of the therapeutically active compounds 2-(5'-nitro-2'-furfurylmercapto)pyridine-1-oxide and 2-(2'-furfurylmercapto)pyridine-1-oxide, it will be apparent to those skilled in the art that other applications of the reaction are possible. Thus, quinoline compounds can be used to replace the pyridine compounds and various substituents may also be present on either heterocyclic ring.

The following examples are given solely for the purpose of illustration only and are not to be construed as limitations of this invention, many apparent variations of which are possible without departing from the spirit or scope thereof.

EXAMPLE I

2-(5'-Nitro-2'-Furfurylmercapto)Pyridine-1-Oxide

A mixture of 464 g. of 2-(2'-imidazolinylmercapto)-pyridine-1-oxide hydrochloride and 325.5 g. of 5-nitrofurfuryl chloride in 3350 ml. of methanol was maintained at between 20° C. and 36° C. while adding 269 ml. of concentrated ammonium hydroxide. The mixture was stirred for one hour during which time the desired product precipitated. It was recovered by filtration, washed with methanol and dried. The yield of product melting at 173.5–174° C. (d.) was 69.2% of theoretical.

EXAMPLE II

2-(2'-Furfurylmercapto)Pyridine-1-Oxide

A mixture of 1 mole of 2-(2'-imidazolinylmercapto)-pyridine-1-oxide hydrobromide and 1.1 moles of furfuryl iodide was taken up in 3 liters of methanol and maintained at 0° C. while adding an equimolar portion of sodium carbonate in 10% aqueous solution. The mixture was stirred for six hours at this temperature and the desired product recovered by filtration.

EXAMPLE III

2-(5'-Nitro-2'-Furfurylmercapto)Pyridine-1-Oxide

A mixture of 1 mole of 2-(2'-imidazolinylmercapto)-pyridine-1-oxide sulfuric acid salt and an equimolar portion of 5-nitrofurfuryl bromide was taken up in 3 liters of a 1:1 mixture of dimethyl sulfoxide and n-pentanol and maintained at 50° C. while adding a 1% excess of solid calcium carbonate. The mixture was stirred for one-half hour at this temperature and the desired product recovered by filtration after cooling to approximately 5° C.

EXAMPLE IV

2(2'-Furfurylmercapto)Pyridine-1-Oxide

A mixture of 1 mole of 2-(2'-imidazolinylmercapto)-pyridine-1-oxide nitric acid salt and an equimolar portion of furfuryl chloride was taken up in 3 liters of ethanol and maintained at 25–30% C. while adding an equimolar portion of solid sodium bicarbonate. The mixture was stirred for one-half hour at this temperature and the desired product recovered by filtration.

EXAMPLE V

2-(5'-Nitro-2'-Furfurylmercapto)Pyridine-1-Oxide

A mixture of 1 mole of 2-(2'-imidazolinylmercapto)-pyridine-1-oxide phosphoric acid salt and an equimolar portion of 5-nitrofurfuryl bromide was taken up in 3 liters of dimethylformamide and maintained at 20–30° C. while adding an equimolar portion of triethylamine. The mixture was stirred for two hours at this temperature and the desired product recovered by filtration.

EXAMPLE VI

2-(5'-Nitro-2'-Furfurylmercapto)Pyridine-1-Oxide

A mixture of 1 mole of 2-(2'-imidazolinylmercapto)-pyridine-1-oxide hydrochloride and an equimolar portion of 5-nitrofurfuryl bromide was taken up in 3 liters of propanol and maintained at 20–30° C. while adding a 1% excess of concentrated ammonium hydroxide. The mixture was stirred for three hours at this temperature and the desired product recovered by filtration.

What is claimed is:

1. A process for the preparation of a compound selected from the group consisting of 2-(5'-nitro-2'-furfurylmercapto)pyridine-1-oxide and 2-(2'-furfurylmercapto)pyridine-1-oxide, which comprises adding up to a 1% molar excess of an alkaline reagent with a $pK_b$ value greater than 4.74 in aqueous solution to a reactant mixture of an acid addition salt of 2-(2'-imidazolinylmercapto)pyridine-1-oxide and a compound selected from the group consisting of furfuryl halides and 5-nitrofurfuryl halides, the halogen atom having an atomic weight greater than 19, in a solvent system consisting of alkanols containing up to five carbon atoms, dimethylsulfoxide, dimethylformamide and mixtures of these while maintaining the temperature between about 0° C. and 50° C., up to a 10% molar excess of any one of the reactants being employed.

2. A process as in claim 1 wherein the halogen atom is bromine.

3. A process as in claim 1 wherein the acid addition salt is a hydrochloride.

4. A process of claim 1 wherein the halide reactant is furfuryl halide.

5. A process of claim 1 wherein the halide reactant is 5-nitrofurfuryl halide.

References Cited in the file of this patent

UNITED STATES PATENTS

| | | |
|---|---|---|
| 2,742,393 | Bernstein et al. | Apr. 17, 1956 |
| 2,922,792 | Rockett | Jan. 26, 1960 |
| 2,922,793 | Rockett | Jan. 26, 1960 |

OTHER REFERENCES

Gilman et al.: Iowa State Colloge, J. of Science (1932), vol. 6, pp. 390–94.

Morton: Chemistry of Heterocyclic Compounds, pp. 449–52 (McGraw-Hill) (1946).